Sept. 26, 1961 S. M. BASES 3,002,185
LOW FREQUENCY PULSE DETECTOR
Filed June 13, 1957
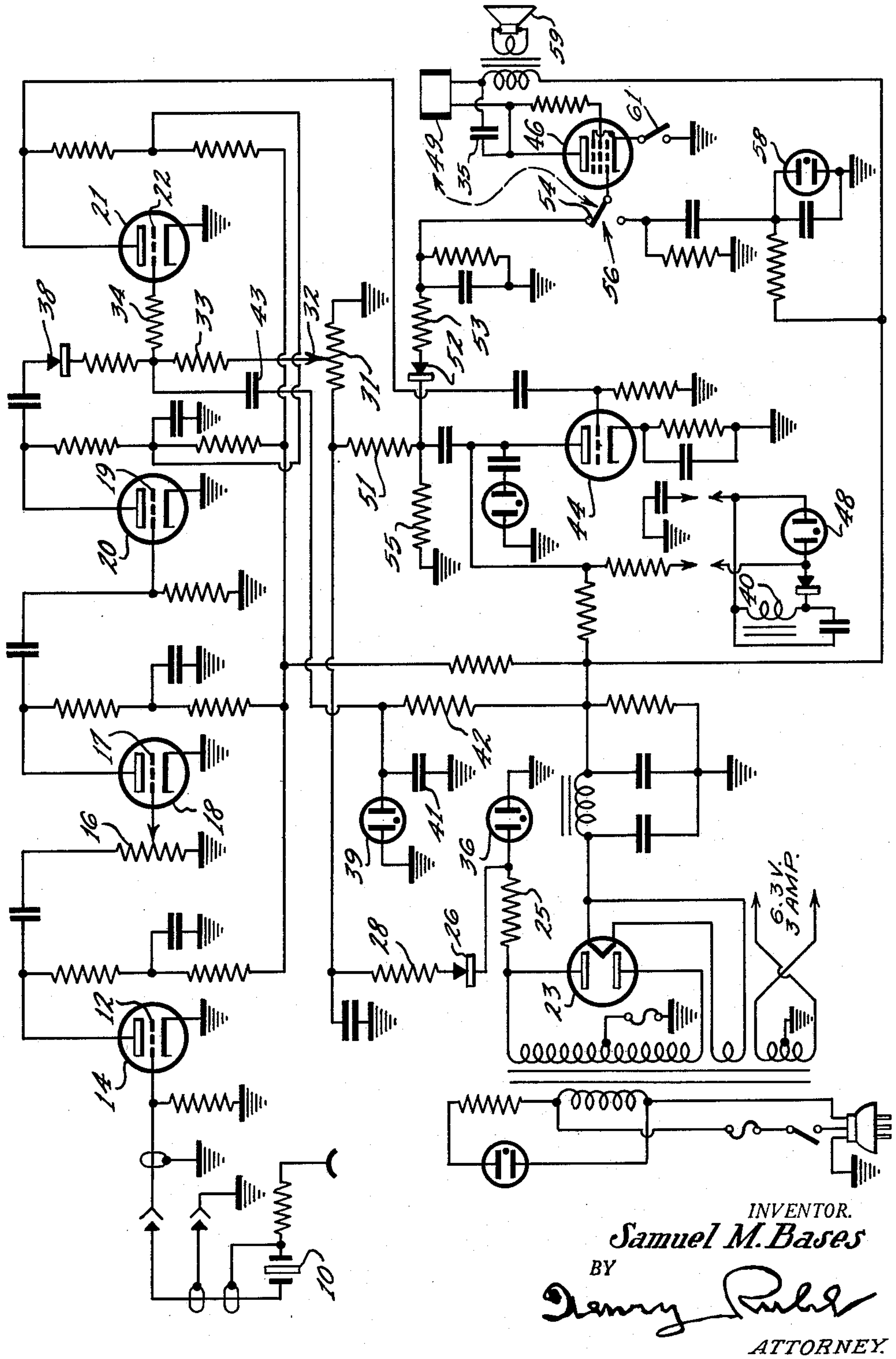
INVENTOR.
Samuel M. Bases
BY
ATTORNEY.

United States Patent Office 3,002,185
Patented Sept. 26, 1961

3,002,185

LOW FREQUENCY PULSE DETECTOR

Samuel M. Bases, 19 Standish Ave., Yonkers, N.Y.

Filed June 13, 1957, Ser. No. 665,406
5 Claims. (Cl. 340—213)

The present invention relates to low frequency pulse detectors, and, more particularly, to a novel pulse detector and signal converter for detecting and providing an indication of low frequency acoustic pulses such, for example, as the heart beat of a patient.

In accordance with the invention, an impulse source is coupled acoustically to a microphone. In the illustrative example, the heart beat of a patient is picked up by a sensitive contact microphone. The output of the microphone is fed into three high gain amplifier stages connected in cascade. The output of the third stage is rectified by a crystal diode which converts the heart beat into a D.C. pulse. The next stage, also an amplifier, has an A.C. signal applied to it but is biased to cutoff except when the D.C. pulse from the rectifier allows it to conduct. The output of this stage, now an A.C. pulse, is further amplified and appears at the output indicator. (The output indicator is a neon bulb and high impedance sounder relay.) The net effect of using the D.C. pulse circuit and the neon bulb relay sounder output indicator is such that no output whatsoever appears, except for the desired heart beat. This enables the monitor to be entirely free of extraneous or stray output. A small part of the A.C. output pulse is again rectified and applied to a combination time delay-amplifier circuit. If cardiac arrest or dangerously low heart rate occurs, this circuit operates and an audible alarm signal appears.

An object of the present invention is to provide a novel pulse detector.

Another object of the present invention is to provide a novel system for providing signals in accordance with a patient's heart beat.

A further object of the present invention is to provide a system which is free of extraneous or stray output.

A still further object of the present invention is to provide an indication of cardiac arrest or dangerously low heart rate.

Other objects and advantages of the present invention will, of course, become apparent and immediately suggest themselves to those skilled in the art to which the invention is directed from a reading of the following specification in connection with the accompanying drawing in which the single figure, thereof, is a schematic showing of a pulse detector system in accordance with the invention.

In the drawing, 10 is a microphone, such as a crystal microphone. This microphone feeds the grid 12 of an amplifier tube 14. The plate circuit of the tube 14 is coupled to a sensitivity control 16 which is connected to the grid 17 of a second amplifier tube 18. The output from the tube 18 is coupled to the grid 19 of a third amplifier tube 20.

The fourth amplifier tube 21 has an adjustable bias applied to its grid 22 from the power supply full wave rectifier 23 through a crystal diode 26 in series with a resistor 25, a resistor 28 and, also, in series with a one megohm potentiometer 31. The slider 32 of the potentiometer 31 is connected to the grid 22 of the tube 21 through a resistor of high resistance (2.2 megohms) 33 and a second high resistance resistor (1 megohm) 34. A voltage regulator tube 36 (NE–2) acts as a voltage regulator for the diode rectifier circuit. The potentiometer 32 varies the bias on the fourth stage tube 21.

Two separate inputs are applied to the fourth stage (not including the external bias voltage). The first comes from the third stage tube 20, and is fed through a half wave rectifier 38 to the grid.

The second is a sawtooth audio tone developed by a relaxation oscillator comprising a Neon tube (NE–2) 39 shunted by a .002 mf. capacitor 41. A 3.9 megohm resistor 42 connects to the filtered +B supply. The waveform of this oscillator is not important and it is connected to the grid 22 of the tube 21 by way of a capacitor 43.

An electronically keyed amplifier which will indicate the heart beat only, and no outside or extraneous noises is included in the system. The electronically keyed amplifier is included in the fourth stage 21. This stage normally is cut-off by the external bias. A heart beat pulse, when rectified, raises the D.C. grid voltage and permits the sawtooth voltage to be amplified by the tube. This A.C. voltage is again amplified by the triode 44. The triode 44 may be one section of a 6U8 tube, the other section being a tube 46. The applied A.C. voltage appears as a flash of the Neon tube 48 (NE–32) and a click of the sounder.

The sounder is a plate relay 40 having a resistance of 2,000 to 15,000 ohms. The purpose is to supply the audible "beat" of the heart. The "click" is much easier on the ear than the sound of the heart itself or an audio tone. In practice of the invention, the audio tone at each heart beat proved to be irritating after a short period of time. The contacts of the relay 40, a SIGMA 5F, are not used.

The A.C. sawtooth voltage is of a much higher frequency than the actual heart beat and is more easily "put to work" in the 6U8 and time delay circuits as well as in the display circuits. By setting the bias level properly, stray electrical noise and background sounds will not raise the D.C. grid voltage of the tube 44 sufficiently to cause an output of the display circuits.

The time delay circuit may be traced from bias lead through a resistor 51, a diode 52, a resistor 53, and a contact 54 of a set of relay contacts 56 of a plate relay 49. The relay 49 is shunted by a capacitor (.068 mf.) 35. The movable tongue of the relay contacts goes to the control grid of the tube 46. Part of the A.C. pulse from the tube 44 is rectified and filtered and added to a fixed negative voltage from the bias and divider network 51 and 55. The resultant is applied to the pentode 46. If A.C. pulses appear often enough the voltage at the relay contacts is sufficiently negative to keep the pentode plate current practically zero. However, if the heart stops or slows down to a very low rate, the voltage at the relay contacts rises until the plate current is great enough to activate the plate relay 49. When this happens, the grid of the pentode is connected to an A.C. audio voltage from a Neon relaxation oscillator 58 and an alarm note is sounded at the speaker 59. A switch 61 in the cathode of the pentode can be used to disable the alarm circuit if so desired, or shut it off after it sounds.

The pentode section 46 is used as an audio power amplifier to produce the alarm "note." When the switch 61 is open, the alarm circuit is disabled, but the monitor still functions as described.

Tube types, component values, and apparatus designations are given solely by way of example, and not in a limiting sense.

What is claimed is:

1. A pulse detector comprising means to provide a source of electrical signal pulses, an amplifier, means to supply said pulse signals to said amplifier, means to bias said amplifier to its nonconductive state, said amplifier being conductive upon occurrence of a pulse, a voltage waveform source, means to couple said waveform source to said amplifier, a second amplifier, means to couple said first amplifier to said second amplifier, said second amplifier having an output circuit, said output circuit of said second amplifier having means to develop a bias voltage when said first amplifier conducts, a third amplifier having an input circuit, means for supplying said bias voltage to said input circuit of said third amplifier, a second voltage waveform source, and means operative upon excitation thereof to couple said second waveform source to said input circuit of said third amplifier, said last named means becoming operative upon occurrence of a change in said developed bias voltage.

2. A pulse detector comprising means to provide a source of amplified electrical signal pulses, an amplifier, means to supply said pulse signals to said amplifier, means to bias said amplifier to its nonconductive state, said amplifier being conductive upon occurrence of a pulse, a voltage waveform source, means to couple said waveform source to said amplifier, a second amplifier, means to couple said first amplifier to said second amplifier, said second amplifier having an output circuit, said output circuit of said second amplifier having means to develop a bias voltage when said first amplifier conducts, a third amplifier having an input circuit, means for supplying said bias voltage to said input circuit of said third amplifier, a second voltage waveform source, and a relay operative upon excitation thereof to couple said second waveform source to said input circuit of said third amplifier, said relay becoming operative upon occurrence of a change in said developed bias voltage.

3. A pulse detector comprising means to provide a source of electrical signal pulses, an amplifier, means to supply said pulse signals to said amplifier, means to bias said amplifier to its nonconductive state, said amplifier being conductive upon occurrence of a pulse, a voltage waveform source, means to couple said waveform source to said amplifier, a second amplifier, means to couple said first amplifier to said second amplifier, said second amplifier having an output circuit, said output circuit of said second amplifier having diode means to develop a bias voltage when said first amplifier conducts, a third amplifier having an input circuit, means for supplying said bias voltage to said input circuit of said third amplifier, a second voltage waveform source, and means operative upon excitation thereof to couple said second waveform source to said input circuit of said third amplifier, said last named means becoming operative upon occurrence of a change in said developed bias voltage.

4. A pulse detector comprising means to provide a source of electrical signal pulses, an amplifier, means to supply said pulse signals to said amplifier, means to bias said amplifier to its nonconductive state, said amplifier being conductive upon occurrence of a pulse, a voltage waveform source, means to couple said waveform source to said amplifier, a second amplifier, a direct current voltage supply source for said second amplifier, means to couple said first amplifier to said second amplifier, said second amplifier having an output circuit, said output circuit of said second amplifier having means to develop a bias voltage when said first amplifier conducts, a third amplifier having an input circuit, means for supplying said bias voltage to said input circuit of said third amplifier, a second voltage waveform source, means operative upon excitation thereof to couple said second waveform source to said input circuit of said third amplifier, said last named means becoming operative upon occurrence of a change in said developed bias voltage, and means in circuit with said voltage supply source for said second amplifier and the output thereof to provide pulse signal indication.

5. A pulse detector comprising means to provide a source of electrical signal pulses, an amplifier, means to supply said pulse signals to said amplifier, means to bias said amplifier to its nonconductive state, said amplifier being conductive upon occurrence of a pulse, a voltage waveform source, means to couple said waveform source to said amplifier, a second amplifier, means to couple said first amplifier to said second amplifier, said second amplifier having an output circuit, said output circuit of said second amplifier having means to develop a bias voltage when said first amplifier conducts, a third amplifier having an input circuit, means for supplying said bias voltage to said input circuit of said third amplifier, a second voltage waveform source, means operative upon excitation thereof to couple said second waveform source to said input circuit of said third amplifier, said last named means becoming operative upon occurrence of a change in said developed bias voltage, and a reproducer for the output of said second waveform source, said reproducer being coupled to the output of said third named amplifier.

References Cited in the file of this patent

UNITED STATES PATENTS

| | | |
|---|---|---|
| 2,801,629 | Edmark | Aug. 6, 1957 |
| 2,806,949 | Smith | Sept. 17, 1957 |
| 2,815,748 | Boucke | Dec. 10, 1957 |
| 2,829,637 | McCormick | Apr. 8, 1958 |
| 2,848,992 | Pigeon | Aug. 26, 1958 |
| 2,865,365 | Newland et al. | Dec. 23, 1958 |
| 2,868,971 | Wischmeyer | Jan. 13, 1959 |

OTHER REFERENCES

"Electronics," June 1955, page 178.